UNITED STATES PATENT OFFICE.

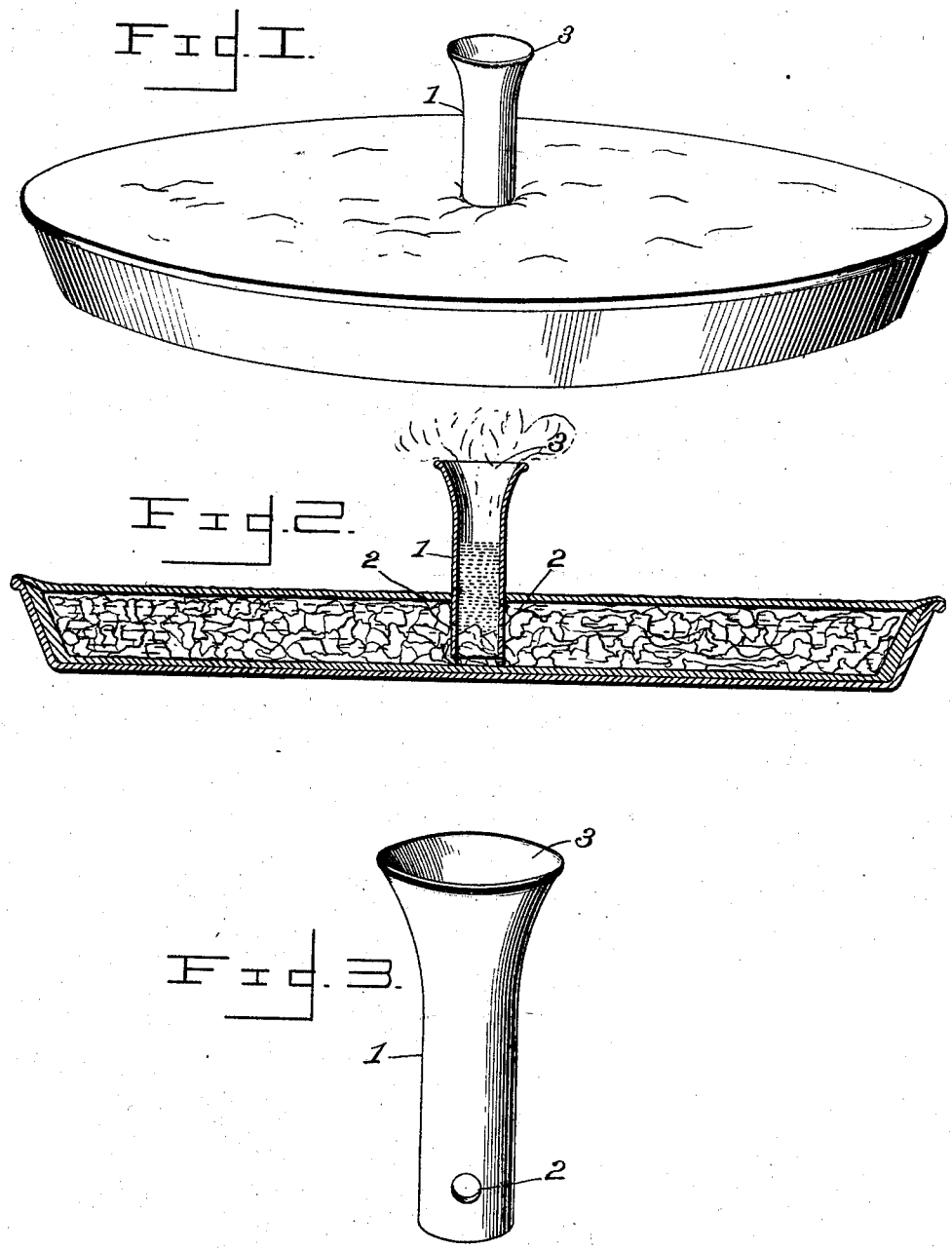

THOMAS W. HERRICK, OF BOSTON, MASSACHUSETTS, ASSIGNOR TO CHARLES W. PRESTON, OF BARTON, VERMONT.

PIE-JUICE SAVER.

SPECIFICATION forming part of Letters Patent No. 647,447, dated April 10, 1900.

Application filed October 6, 1897. Serial No. 654,284. (No model.)

*To all whom it may concern:*

Be it known that I, THOMAS W. HERRICK, a citizen of the United States, residing at Boston, (Allston,) in the county of Suffolk and State of Massachusetts, have invented a new and useful Pie-Juice Saver, of which the following is a specification.

This invention relates to a device for saving the juice of a pie; and the object of the same is to provide a simple and effective device for retaining the juice of the filling within the body of the pie and prevent running out of the same at the edge between the upper and lower crusts, thereby overcoming the disadvantage of scorched and burned juice at the edge of the pie and the unsightly and uncleanly condition due to the juice spreading thereover and becoming sticky and troublesome in removal.

The invention consists of the construction and arrangement of parts which will be more fully hereinafter described and claimed.

In the drawings, Figure 1 is a perspective view of a pie and plate, showing the improved device applied thereto. Fig. 2 is a transverse vertical section through the pie, plate, and improved device. Fig. 3 is a detail perspective view of the improved device.

Similar numerals of reference are employed to indicate corresponding parts in the several views.

The numeral 1 designates the improved device, which is in the form of a tube of non-corrosive material, preferably aluminium, and having diametrically-disposed openings 2 and an upper flared end 3.

In use the lower end of the device is inserted in the center of the pie through the top crust and projected into the filling, and the pie, with the device thus arranged therein, is placed in the oven or other baking-receptacle. As the cooking of the filling proceeds the juice becomes more plentiful and rises in the tube, the openings 2 serving as entrance means therefor. The steam also escapes through the tube, and the upper flared end facilitates its exit and spread, and by thus liberating the steam its pressure is relieved from the interior of the pie, and tendency of outward forcing of the juice at any other point will be obviated, and the juice will be thereby also drawn into the tube. After the pie is cooked and removed from the oven the juice will run back from the tube into the pie, the said tube being left long enough in the pie to permit this operation to completely ensue.

By the use of this improved device a pie is rendered more delicious and palatable by preserving the full flavor and juice, and the disadvantages heretofore set forth are also entirely obviated.

The simplicity and cheapness as well as its usefulness will make the device a valuable addition to cooking utensils and to the art of making pastry of the character set forth.

Having thus described the invention, what is claimed as new is—

As an improved article of manufacture, a pie-juice saver consisting of a tube having the major portion thereof of equal diameter, and the one extremity flared, the opposite extremity being provided with diametrically-opposed openings, the device being disposed vertically when in use and supported solely by the pie, both ends being open and the diametrically-opposed openings being located within the interior of the pie and forming the sole entrance to the tube except the opposite open ends.

THOMAS W. HERRICK.

Witnesses:
EDWIN W. SCHILDKNECHT,
WM. H. BROWN.